United States Patent [19]
Wallace et al.

[11] Patent Number: 5,986,438
[45] Date of Patent: Nov. 16, 1999

[54] ROTARY INDUCTION MACHINE HAVING CONTROL OF SECONDARY WINDING IMPEDANCE

[75] Inventors: Alan K. Wallace, Corvallis, Oreg.; James A. Oliver, Corona, Calif.

[73] Assignee: Heller-DeJulio Corporation, San Ramon, Calif.

[21] Appl. No.: 09/064,977

[22] Filed: Apr. 23, 1998

[51] Int. Cl.⁶ ........................................... H02H 7/06
[52] U.S. Cl. ............................. 322/20; 322/32; 322/47; 318/821; 318/822; 318/825
[58] Field of Search ........................ 322/20, 29, 32, 322/47; 318/821, 825, 827, 829, 822

[56] References Cited

U.S. PATENT DOCUMENTS

| | | | |
|---|---|---|---|
| 455,067 | 6/1891 | Tesla | 310/166 |
| 610,025 | 8/1898 | Bradley | 310/166 |
| 853,465 | 5/1907 | Mershon | 310/166 |
| 911,147 | 2/1909 | Mershon | 322/47 |
| 1,837,563 | 12/1931 | Mayer | 310/166 |
| 1,854,447 | 4/1932 | Chromy | 310/166 |
| 2,160,594 | 5/1939 | Krebs | 171/223 |
| 2,642,808 | 6/1953 | Thomas | 103/126 |
| 2,648,808 | 8/1953 | Tiede | 318/814 |
| 2,881,276 | 4/1959 | Mintz et al. | 200/61.45 |
| 3,774,883 | 11/1973 | Ostrom | 254/172 |
| 3,969,659 | 7/1976 | Thode | 318/237 |
| 4,006,399 | 2/1977 | Studtmann | 322/47 |
| 4,019,104 | 4/1977 | Parker | 318/195 |
| 4,206,345 | 6/1980 | Maass et al. | 219/524 |
| 4,206,395 | 6/1980 | Okuyama et al. | 318/716 |
| 4,242,628 | 12/1980 | Mohan et al. | 322/35 |
| 4,532,465 | 7/1985 | Renard | 318/814 |
| 4,642,545 | 2/1987 | Lewus | 318/749 |
| 4,833,584 | 5/1989 | Divan | 363/37 |
| 4,959,573 | 9/1990 | Roberts | 310/68 R |
| 5,029,265 | 7/1991 | Staats | 318/729 |
| 5,525,894 | 6/1996 | Heller | 322/20 |
| 5,587,643 | 12/1996 | Heller | 318/821 |

*Primary Examiner*—Nestor Ramirez
*Assistant Examiner*—B. Mullins
*Attorney, Agent, or Firm*—Flehr Hohbach Test Albritton & Herbert LLP

[57] ABSTRACT

A rotary induction machine having wound primary and secondary windings with resistive means connected in series with secondary windings and inductive reactive means connected across said resistive means, with the inductive reactance means and resistive means selected to provide an effective resistance which controls the current in the generator secondary windings, whereby the generator rated current is reached at the highest slip for the range of desired power output.

6 Claims, 6 Drawing Sheets

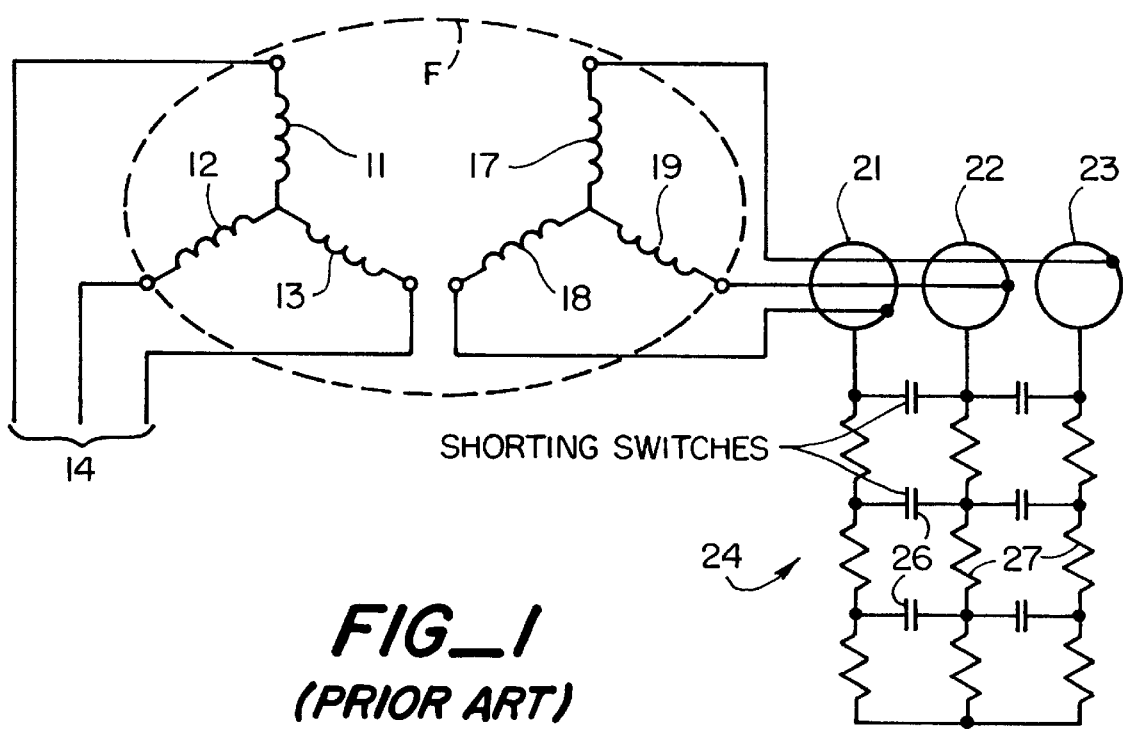
FIG_1
(PRIOR ART)
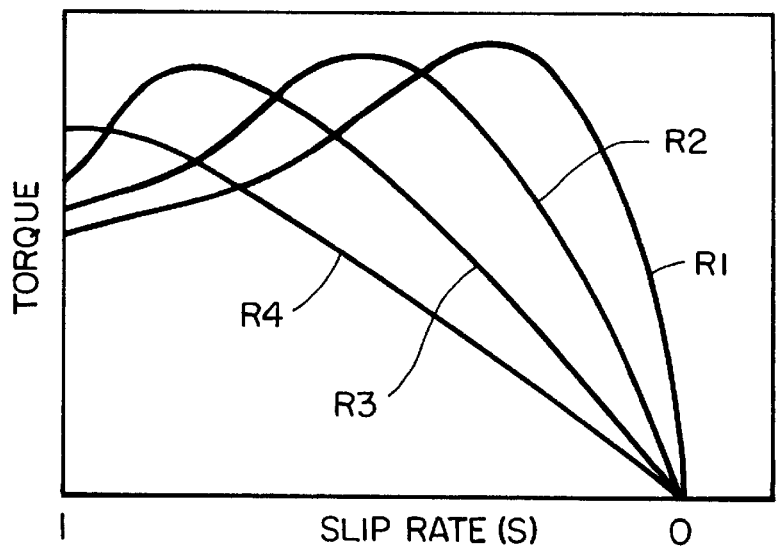
FIG_2
(PRIOR ART)

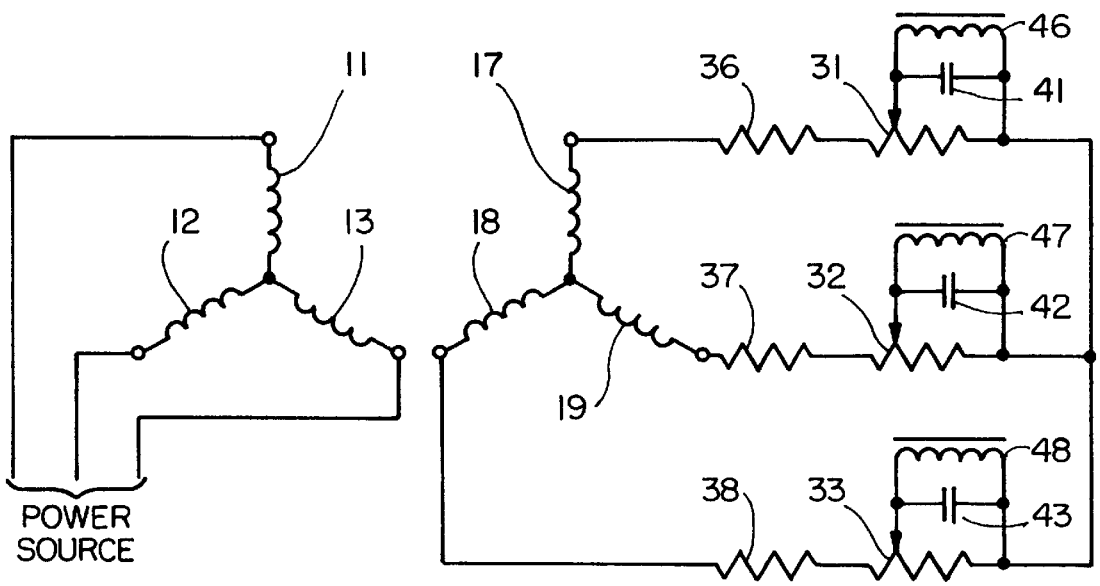
FIG_3
*(PRIOR ART)*
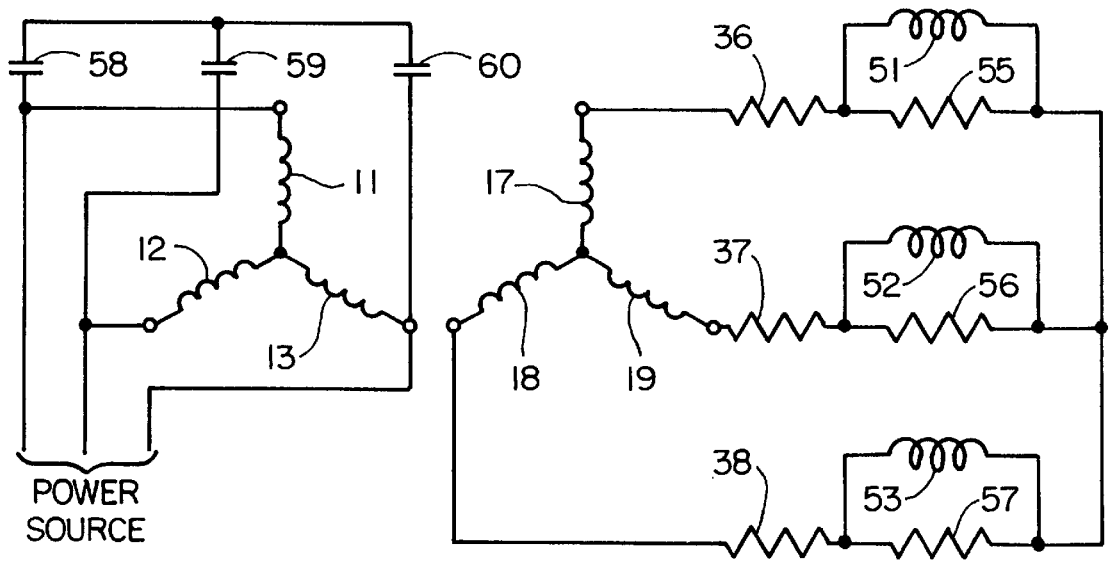
FIG_4

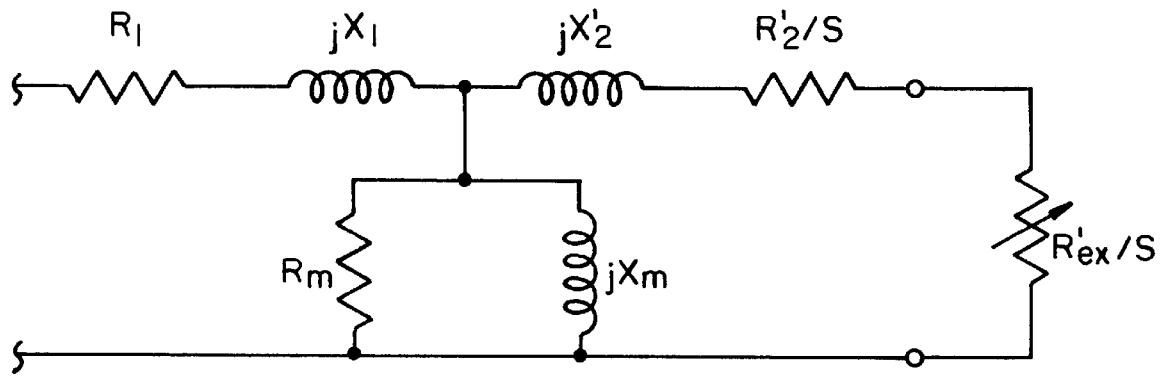
FIG_5
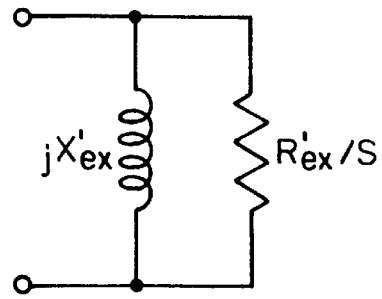
FIG_6
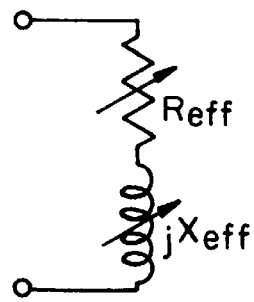
FIG_7

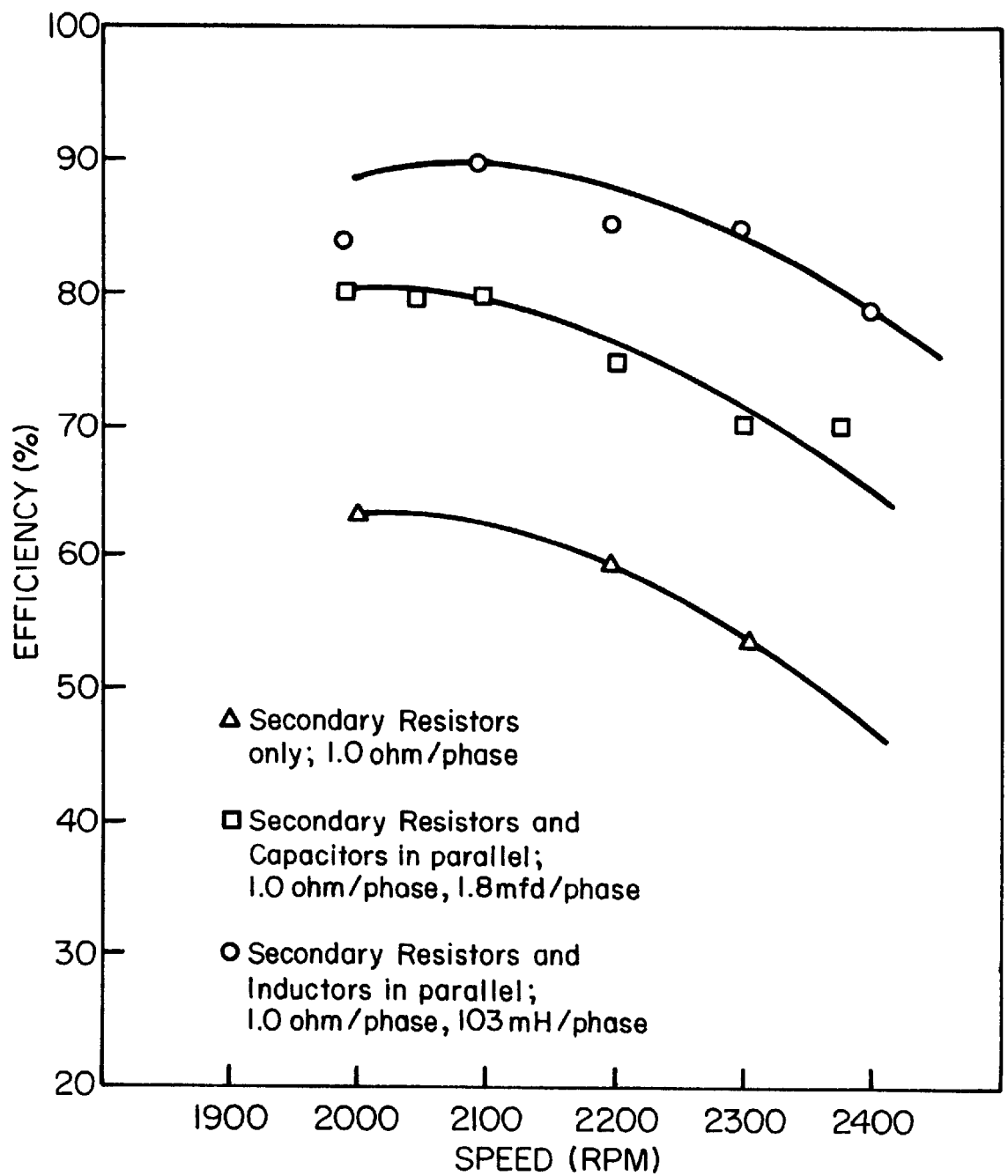
FIG_8

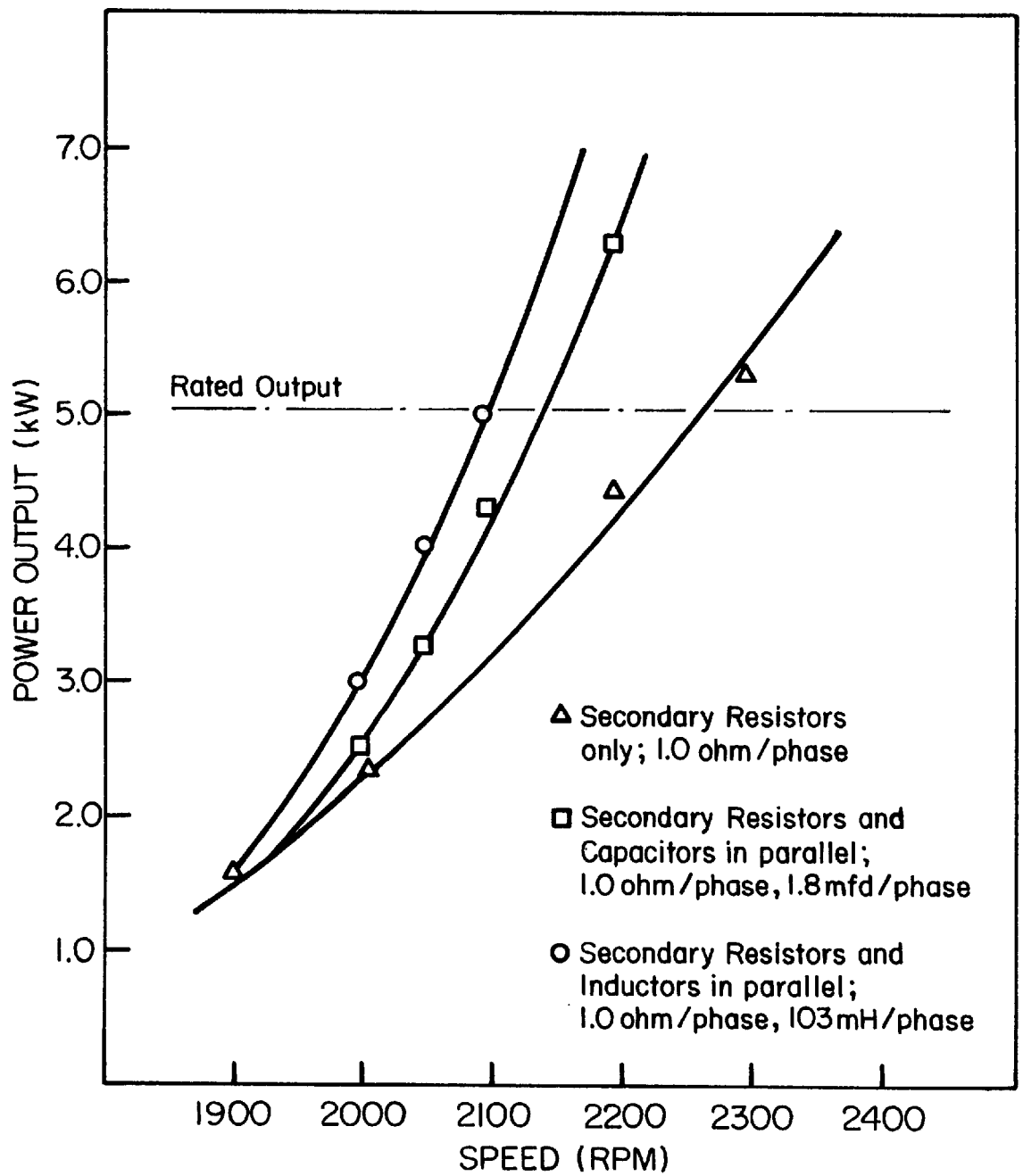
FIG_9

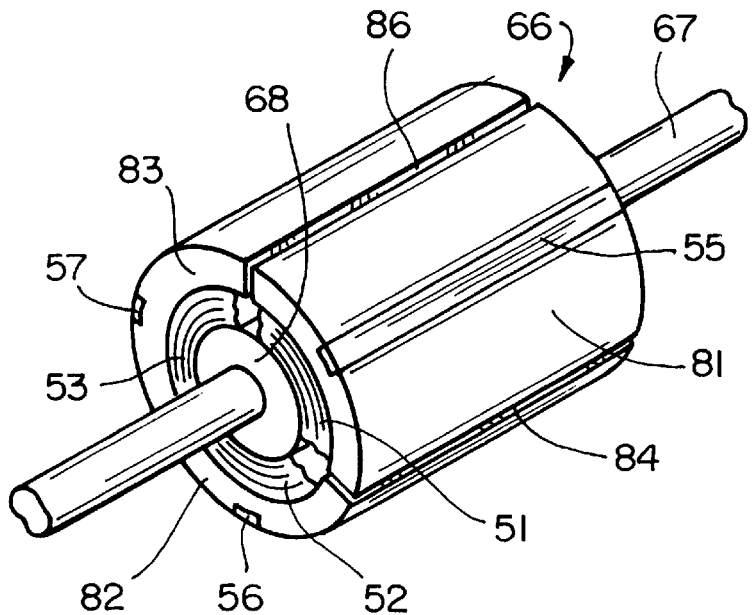
FIG_10
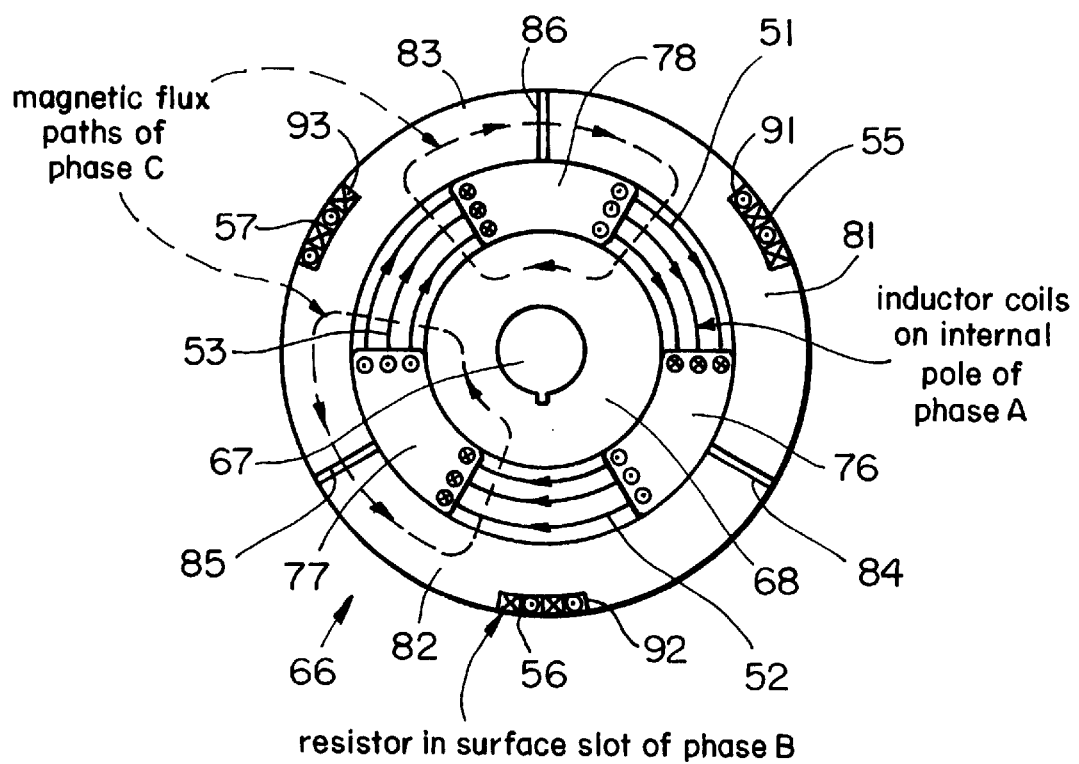
FIG_11

ROTARY INDUCTION MACHINE HAVING CONTROL OF SECONDARY WINDING IMPEDANCE

FIELD OF THE INVENTION

This invention relates generally to rotary induction machines of the type having a wound rotor and more particularly to wound rotor induction motors and generators in which the impedance of the secondary is controlled by connecting parallel inductors and resistors in series with the secondary windings. The inductors and resistors can be mounted directly on the rotor.

BACKGROUND OF THE INVENTION

In a singly-fed induction machine the currents in the secondary winding (usually the rotor) are created solely by induction. These currents result from voltages induced in the secondary windings by rotating magnetic fields in the primary winding which arise from the application of line voltages thereto. These fields rotate at a speed, called synchronous speed, which is determined by the frequency of the applied voltage and the number of poles.

When the machine is operated as a motor, the rotor rotates at speeds below the synchronous speed. The difference in speed between synchronous and rotor speed is referred to as the slip speed, usually expressed as a per unit or percentage of the synchronous speed.

The rotor windings are generally connected to slip rings to which external adjustable resistances can be connected in series with the windings. These resistances limit the secondary currents during "start" of operation as a motor. As the motor picks up speed, the external resistance is gradually reduced whereby the efficiency increases. The resistance can also be used to control the speed; however, this method of speed control is very inefficient.

When the rotor is driven at above the synchronous speed, the machine acts as a generator. With resistance in the secondary windings, the output power can be maintained somewhat constant over a narrow range of rotor speeds.

Conventionally, when driving a generator with various types of prime movers, the speed of the electrical generator was kept nearly constant. Various mechanical methods for controlling speed have been used depending on the prime mover. When using an alternator with DC excited fields, for 60 Hz output frequency, the speed must be kept constant to a very close tolerance; i.e. to within one revolution per minute for synchronous speed of 1800 or 3600 revolutions per minute. When using a squirrel-cage induction generator, the most common generator for wind turbines, operation at a small percent above synchronous speed is necessary. If, inadvertently, a higher torque is supplied by the prime mover, the generator completely releases its load and a "runaway condition" exists. Under such circumstances, the prime mover, a wind or steam turbine, or a diesel, may race to destruction in a very few seconds.

However, variable speed generators are desirable for wind turbines to follow the changes in wind velocity and to reduce wear in the gear box which matches generator speed to turbine speed. Variable speed is also needed to eliminate voltage flicker caused by power surges from wind gusts.

For variable speed wind generators, power electronics may be used to control rotor voltage and frequency using the wound rotor induction machine. Power electronic controls tend to be complex with many components, they require feed-back circuits to match injected rotor frequency to turbine speed, and they may produce troublesome electrical harmonics. For wave generators, fixed resistors are being used to provide variable speed, with very poor efficiency.

In U.S. Pat. No. 2,648,808 there is described a motor having a wound primary winding (stator) in which the effective impedance of the primary windings is varied to improve the torque-speed characteristics of the motor. More particularly, the power factor of the motor is improved by controlling the impedance of the primary windings by adding thereto external series impedances.

U.S. Pat. Nos. 5,525,894 and 5,587,643 use secondary resistors and secondary capacitors for variable-speed wound rotor generator control. In the first patent, they are used for load limiting and in the second patent, they are used for increased power output and improved efficiency.

In generators which include slip rings and brushes, the slip rings and brushes are a common source of increased maintenance costs. The carbon brushes function best with a current density of about 60 amperes per square inch and with a certain amount of humidity in the surrounding atmosphere. With a fixed current density of about this value and reasonable humidity, the transfer of current between slip ring and brush is efficient. Under these conditions, an interchange of electrons takes place between the surfaces of the metallic slip rings and the carbon brushes which develops a lubricating film. This film allows current transfer with a very low voltage drop, with no heating, and with little friction between the fixed brushes and the rotating rings.

However, if the current density becomes too low, or if the humidity becomes too low, the lubricating film does not develop. The voltage drop, heating and friction all increase at the brush-ring interface. The carbon brush now acts as an abrasive against the slip ring, wearing both the slip ring and the brush. Carbon and metallic dust is created which conducts electricity. When it finds its way into the generator winding, winding failures can result.

With wind and wave generators, the generator load varies, depending on the amount of wind or wave activity, so it is impossible to maintain a constant current density in the carbon brushes. The wind and wave generators are not readily accessible. Wind generators are usually mounted high on a tower, and wave generators are at sea. Accordingly, there are very high maintenance costs associated with checking on the condition of the brushes and rings, replacing worn brushes, resurfacing slip rings, cleaning the windings of carbon dust, and in repairing failures.

OBJECTS AND SUMMARY OF THE INVENTION

It is a general object of this invention to provide an improved rotary induction machine.

It is a further object of this invention to provide a wound rotor induction generator in which inductors are connected directly across an external resistor, and the combination is in series with the secondary winding to improve efficiency.

It is a further object of this invention to provide a wound rotor induction generator with a high power factor. Another object of this invention is to provide a brushless variable speed or fixed speed induction generator with high efficiency.

It is a further object of this invention to provide an induction generator which can be operated efficiently over a wide range of rotor speeds, but at line frequency.

An objective for power generation is to get maximum power output, high efficiency, system robustness and low cost. The generator of the present invention can deliver power over a much wider speed range at better efficiency than known induction generators. The generator maintains its output frequency over a variable speed range. The generator is ideally suited for "peaking" requirements with diesel, steam or gasoline type prime movers and for wind and wave powered generators.

Since the control elements of this invention are passive and have fixed values of resistance and inductance, it is possible to mount these circuit elements on the generator rotor shaft. This eliminates the commonly used slip rings and carbon brushes which are a source of failure and increased maintenance costs.

BRIEF DESCRIPTION OF THE DRAWINGS

FIG. 1 is a schematic diagram of an induction motor in accordance with the prior art.

FIG. 2 is a graph showing power output as a function of slip for the prior art device shown in FIG. 1.

FIG. 3 is a schematic diagram of a wound rotor induction machine in accordance with the prior art.

FIG. 4 is a schematic diagram of a wound rotor induction machine in accordance with the present invention.

FIG. 5 is an equivalent circuit used to calculate the values for external resistance.

FIG. 6 is a circuit of the parallel external resistor-inductor combination.

FIG. 7 is the effective equivalent series circuit for the circuit of FIG. 6.

FIG. 8 shows generator efficiency as a function of speed for various circuit combinations including the embodiment of FIG. 4.

FIG. 9 shows the speed-power output curve of the embodiment of FIG. 4 as compared to that of the prior art.

FIGS. 10 and 11 schematically show an implementation of rotating external resistors and inductors.

DESCRIPTION OF THE PREFERRED EMBODIMENT

The prior art induction machine shown in FIG. 1 includes primary windings 11, 12, 13 shown connected in a "Y" configuration connected to the voltage supply 14. The windings are wound in the stator of the machine in accordance with well known winding practices. The voltage applied produces currents in the windings which generate a primary field "F" which is coupled to the wound rotor including windings 17, 18, 19. The rotor is mechanically attached to a shaft, not shown. Each of the secondary windings is connected to a slip ring 21, 22, 23, respectively, which in turn is connected to a resistive network 24 which includes shorting switches 26 and resistors 27.

As described above, all switches are open as voltage is first applied to start the machine. The resistance in series with the rotor windings is maximum, thereby limiting the starting current. As the rotor speed increases the switches are sequentially closed to thereby remove more and more resistance, thereby allowing the speed to increase and provide maximum torque at higher speeds. The current reduces because the relative speed between the primary magnetic field and the rotor windings is reduced, thereby reducing the induced voltage.

Referring particularly to FIG. 2, the curves show the torque as a function of slip rate. It is seen that, with the resistance R4, the maximum power (torque) is achieved at a high slip rate, and that, as the resistance is decreased from R4 to R1, high power (torque) is achieved at lower slip rates. The efficiency is substantially higher when the resistance is low because the resistive losses in the rotor secondary unit are minimized.

The prior art teaches that the operating characteristics of an induction motor or generator are substantially improved by adding in the secondary windings a reactive impedance. A prior art machine is shown in FIG. 3. Potentiometers 31, 32 and 33 are connected in series, one with each winding to provide adjustable resistance. The internal winding resistance is shown at 36, 37 and 38. The potentiometer wiper is connected to a parallel combination of a bridging capacitor 41, 42 and 43 and an inductor 46, 47 and 48. Prior art shows that connecting capacitors in parallel with external secondary resistance improves the power output and efficiency.

We have discovered that by connecting only inductors directly across external resistors with the combination in series with the rotor windings, the efficiency of the machine is substantially improved over that obtained with capacitors. The efficiency of the machine is improved to the extent that it is comparable to the efficiency being obtained when high efficiency power electronic circuits are connected in the secondary, but without the complexity, potential for failure, feedback circuits, electrical harmonics and high capital cost of the latter. In FIG. 4 the inductors 51, 52 and 53 are connected in series with the secondary windings and in parallel to external series resistors 55, 56 and 57. Capacitors 58, 59 and 60 in the primary provide power factor improvement.

The external inductors, when connected in parallel with the external resistors, act as a variable shunt around the external resistors. At rotor speed slightly above synchronous speed, the frequency induced in the rotor circuit is small, so the inductor acts as a small resistor in parallel with the external resistor, reducing the net value of external resistance according to the equation for parallel resistors.

$$R_{net} = \frac{R_L R_{ext}}{R_L + R_{ext}}$$

where:

$R_{net}$ is the net effective resistance of the external rotor circuit;

$R_L$ is the resistance of the external inductor; and $R_{ext}$ is the resistance of the external resistor.

With low net external resistance, the rotor $I^2R$ loss is reduced and the efficiency is improved.

As rotor speed is increased above the synchronous speed, the inductive reactance is increased according to $$X_L = 2\pi f L$$

where:

$X_L$ is the inductive reactance of the external inductor, in ohms;

f is the rotor frequency, in Hertz (slip times the stator frequency); and

L is the inductance, in Henries, of the inductor.

As the inductive reactance increases with rotor speed, the rotor speed and torque is controlled by the inductive impedance of the matrix consisting of the external resistor and the parallel external inductor with its own resistance. By carefully selecting the values of external resistance, and, by employing the inductor impedance, the machine will have the requisite speed range with high efficiency.

The amount of external resistance and inductive reactance can be calculated by reference to the per phase equivalent circuit of the generator (FIGS. 5, 6 and 7) in which:

$R_1$=stator winding resistance;

$jX_1$=stator winding reactance;

$R_m$=magnetization loss resistance;

$jX_m$=magnetization reactance;

S=rotor slip;

$R'_2$=rotor winding resistance;

$jX'_2$=rotor winding reactance;

$R'_{ex}$=external resistor resistance; and $jX'_{ex}$=external reactor reactance;

Quantities identified with ' are referred to the stator by multiplying the values by the stator to rotor turns ratio squared $(n_1/n_2)^2$.

From an analysis of the equivalent circuit of FIG. 5, it can be shown, to a reasonable level of approximation, that the slip at which peak torque occurs is given by $$Sp = \pm \frac{R_T}{X_T} \quad (1)$$

in which the positive sign is for motor operation and the negative sign is for generator operation, where $$R_T = (R'_2 + R'_{ex}) \quad (2)$$

and $$X_T = (X_1 + 40\, X_2) \quad (3)$$

Equation (1) is linear and can be solved analytically. If the values of $X_T$, $R'_2$ are known then a suitable value of $R'_{ex}$ can be derived for a required slip.

If, now, the adjustable external resistor, $R'_{ex}$, is replaced by a parallel combination of fixed resistor and inductor of reactance $X'_{ex}$ at line frequency (FIG. 6) they can be replaced by the equivalent series combination shown in FIG. 7, in which $$R_{eff} = \frac{\frac{R'_{ex}}{S}(X'_{ex})^2}{\left(\frac{R'_{ex}}{S}\right)^2 + (X'_{ex})^2} \quad (4)$$

and $$X_{eff} = \frac{\left(\frac{R'_{ex}}{S}\right)^2 X'_{ex}}{\left(\frac{R'_{ex}}{S}\right)^2 + (X'_{ex})^2} \quad (5)$$

Thus, it is evident that the effective series resistance is continually modified as the generator speed (and slip, S) change. The total machine resistances and reactances are given by $$R_T = R'_2 + \frac{R'_{ex}(X'_{ex})^2}{\left(\frac{R'_{ex}}{S}\right)^2 + (X'_{ex})^2} \quad (6)$$

and $$X_T = X_1 + X'_2 + \frac{(R'_{ex})^2 X'_{ex}}{\left(\frac{R'_{ex}}{S}\right)^2 + (X'_{ex})^2} \quad (7)$$

Analysis of the equivalent circuit, neglecting stator resistance, shows that to a reasonable approximation the available torque (where torque=power/speed) of the machine is given by $$T = \left(\frac{V^2}{2\pi N_S X_T}\right)\left(\frac{\left(\frac{R_T}{X_T}\right)S}{\left(\frac{R_T}{X_T}\right)^2 + S^2}\right) \quad (8)$$

where V=stator applied voltage, and $N_s$=synchronous speed in revolutions per second.

Because both $R_T$ and $X_T$ are functions of slip in equations (6) and (7) when these are substituted into, equation (1) it becomes highly non-linear and cannot be solved analytically. However, by computer program of the equivalent circuit, using external elements $R_{eff}$ and $X_{eff}$, as given by equations (4) and (5), the performance of the generator system can be predicted, and suitable values for both $R_{ex}$ and $X_{ex}$ can be determined if the required maximum slip range is known. As a first approximation the external resistance is calculated as the value needed to produce the required range without the parallel inductor. This starting value is always too large due to the normal operating condition of the machine being at a lesser slip than the maximum torque condition. The initial value of the external reactance is selected as being approximately an order of magnitude greater than the magnetization reactance of the generator itself. Using these initial values, the calculation process of the equivalent circuit is repeated with decreasing external resistance values until the machine rated current is reached at the highest slip needed for the range of operation.

A commercial three-phase 1460 volt, 1715 rpm, 5 kW generator purchased from Sterling Electric, Serial No. 35,206, was tested with:

a) conventional resistor control with 1 ohm in each rotor phase;

b) resistor and parallel capacitor control, with 1 ohm and 1800 microfarads of capacitance per phase, in accordance with prior art; and c) resistor and parallel inductor control, with 1 ohm and 0.013 henries per phase, in accordance with the embodiment of this patent.

As can be seen in the test curves of efficiency vs. speed (FIG. 8) this invention provides a previously unheard of level of high efficiency for the wound rotor induction generator, without electronic control, when operating at variable speed, above synchronous speed. The resistor/reactor control also was shown to improve the power factor. Further improvement in power can be obtained by applying a small amount of power factor correction capacitors to the stator leads. The efficiency of the resistance/inductance scheme was shown to be the best, in fact, equal to that of generator control schemes using state-of-the-art power electronic circuits.

For wind turbines, a speed range of 15% is adequate. This test data shows that 15 to 20% speed range is practical with efficiency levels of 89 to 90%, and up to 92%.

Power vs. speed characteristics for the three rotor resistance/impedance combinations that were tested are shown in FIG. 9. This data demonstrates that the high efficiency of the embodiment of this patent is obtained without significant loss of power output over the speed range.

The resistor/reactor control, described herein, allows the output of the generator to match the input to the generator from the prime mover. The prime mover determines the generator speed and torque loading. There are no feedback controls associated with this generator. The prime mover may operate with variable speed, as is the case of wind and wave turbines, or it may operate with fixed speed as might be the case of a steam turbine, a gas turbine, or an engine prime mover.

If it were desirable to control the speed of the generator by feedback control, the fixed value reactance used for the external inductor can be replaced with a variable value reactor, such as a saturatable-core reactor, which would allow generator speed to be controlled by a feedback signal.

By way of illustration, an implementation of a suitable resistor/inductor combination is schematically shown in FIGS. 10 and 11. The resistors and inductors are supported by a rotor assembly 66 which can be mounted on the generator shaft 67 and keyed for rotation therewith. This permits direct connection of the resistors and inductances to the three-phase generator windings 17, 18 and 19. The rotor assembly 66 includes a laminated steel core 68. Three phase inductor windings 51, 52 and 53 are wound onto internal poles defined by slots 76, 77 and 78. Outer laminated core portions 81, 82 and 83 define linearizing gaps 84, 85, 86. Slots 91, 92, 93 in the outer core portions support resistors 55, 56 and 57. Thus, the external resistor/inductor combination is supported on a rotor which rotates with the generator rotor and permits direct connection of the resistors and inductors to the generator windings thereby eliminating the need for slip rings and brushes.

The invention is further defined and delineated by the claims which follow hereto.

What is claimed is:

1. A rotary induction generator having polyphase, primary windings mounted on a stator, and secondary windings mounted on a rotor, including a resistor connected in series with each secondary winding, and an inductive reactor connected across each of said resistors to control the power output for different rotary speeds, and to increase the efficiency of the machine, and capacitors connected in parallel with the stator windings to provide near-unity power factor.

2. A rotary inductor generator as in claim 1 in which said resistors and said inductive reactors are mounted to rotate with said rotor to provide direct connection to said polyphase secondary windings.

3. A rotary induction generator having polyphase primary windings mounted on the stator, and secondary windings mounted on the rotor, including a secondary resistor connected in series with each secondary winding to control the power output for different rotary speeds, and an adjustable value inductive reactor for feedback control connected across said secondary resistor to increase the power output and the efficiency of the machine for a given rotary speed, and capacitors connected in parallel with the stator windings to provide near-unity power factor; said secondary resistors and inductors mounted to rotate with the rotor to thereby eliminate slip rings and carbon brushes.

4. A rotary induction generator having polyphase primary windings mounted on a stator, secondary polyphase windings mounted on a rotor carried by a rotor shaft, an auxiliary rotor mounted on said shaft for rotation therewith, a plurality of inductor windings one for each secondary polyphase winding mounted on said auxiliary rotor, and a plurality of resistors one for each secondary polyphase winding mounted on said auxiliary rotor, said one each of said inductors and said one each of said resistors connected in parallel and connected in series with a corresponding secondary polyphase winding, said inductors and resistors selected to provide an effective resistance which controls the current in the generator whereby the generator rated current is reached at the highest slip for the range of desired power output.

5. A rotary induction generator for operating over a narrow speed range with high efficiency comprising a stator having wound thereon windings defining a three-phase stator;

a rotor mounted for rotation in said stator and having wound thereon three rotor windings defining a three-phase rotor;

said three-phase stator windings adapted to be connected to a source of electrical power and serving as primary windings whereby the applied voltage causes magnetizing current to flow in said three-phase stator windings and provide a rotating magnetic field;

said three-phase rotor windings serving as a secondary winding coupled to said magnetic field whereby voltages are induced in said secondary windings which in turn induce currents in said primary windings in response to rotation of the rotor at rotary speeds above the synchronous speed;

an external resistor connected in series with each of said rotor windings to control the power output for different rotor speeds above the synchronous speed; and inductive means connected across each of said resistors whereby at synchronous speed with the frequency of the rotor current at zero hertz, the inductive means acts as a short circuit and no rotor current flows through the external resistance, thus said inductive impedance increases the efficiency of said generator for a given rotor speed by controlling the amount of current which flows through the external resistance; the values of said inductive means and resistors are selected to provide a varying resistance which controls the current in the generator as a function of rotor speed and frequency, whereby the generator rated current is reached at the desired slip and desired power output.

6. A rotary inductive generator as in claim 1 in which said internal resistance and inductive means are mounted to rotate with said rotor to provide direct connection to said three-phase rotor windings.

* * * * *